(12) United States Patent
Gile et al.

(10) Patent No.: US 6,622,166 B2
(45) Date of Patent: *Sep. 16, 2003

(54) AUDIO/VIDEO FROM INTERNET DIRECT TO COMPACT DISC THROUGH WEB BROWSER

(75) Inventors: Ronald R. Gile, Fort Collins, CO (US); Bruce A. Makinen, Fort Collins, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 113 days.

This patent is subject to a terminal disclaimer.

(21) Appl. No.: 09/955,008

(22) Filed: Sep. 11, 2001

(65) Prior Publication Data

US 2002/0035610 A1 Mar. 21, 2002

Related U.S. Application Data

(63) Continuation of application No. 09/146,711, filed on Sep. 3, 1998.

(51) Int. Cl.[7] .............................................. G06F 15/16
(52) U.S. Cl. ...................................... 709/217; 707/219
(58) Field of Search .............................. 709/217–219, 709/201, 203, 206, 226, 247; 705/26–27; 707/10

(56) References Cited

U.S. PATENT DOCUMENTS

| | | | |
|---|---|---|---|
| 5,572,442 A | * | 11/1996 | Schulhof et al. ............ 709/219 |
| 5,668,996 A | * | 9/1997 | Radinsky .................... 709/322 |
| 5,778,368 A | * | 7/1998 | Hogan et al. ................. 707/10 |
| 5,805,804 A | * | 9/1998 | Laursen et al. ............. 709/223 |
| 5,808,804 A | * | 9/1998 | Moskovich .................. 359/649 |
| 5,809,145 A | * | 9/1998 | Slik et al. ..................... 705/52 |
| 5,809,512 A | * | 9/1998 | Kato ........................... 715/502 |
| 5,860,068 A | * | 1/1999 | Cook ........................... 705/26 |
| 5,880,388 A | * | 3/1999 | Kajiyama et al. ............. 84/609 |
| 5,884,028 A | * | 3/1999 | Kindell et al. ............... 709/234 |
| 5,920,317 A | * | 7/1999 | McDonald ................... 345/853 |
| 5,926,624 A | * | 7/1999 | Katz et al. ................... 709/217 |
| 5,928,327 A | * | 7/1999 | Wang et al. ................... 725/88 |
| 5,930,763 A | * | 7/1999 | Kaneko et al. ................ 705/8 |
| 5,944,605 A | * | 8/1999 | Pajitnov ........................ 463/9 |
| 5,970,473 A | * | 10/1999 | Gerszberg et al. ............ 705/26 |
| 5,995,943 A | * | 11/1999 | Bull et al. .................... 705/14 |
| 5,999,179 A | * | 12/1999 | Kekic et al. ................. 345/734 |
| 5,999,947 A | * | 12/1999 | Zollinger et al. ............ 707/203 |
| 6,005,599 A | * | 12/1999 | Asai et al. ................... 725/116 |
| 6,012,083 A | * | 1/2000 | Savitzky et al. ............. 709/202 |
| 6,026,434 A | * | 2/2000 | Kubota et al. ............... 725/105 |
| 6,061,686 A | * | 5/2000 | Gauvin et al. ................ 707/10 |
| 6,141,489 A | * | 10/2000 | Honda .......................... 386/95 |
| 6,163,316 A | * | 12/2000 | Killian ........................ 345/721 |
| 6,317,779 B1 | * | 11/2001 | Gile et al. ................... 709/217 |

OTHER PUBLICATIONS

G. Stoll et al., "internet Radio And Excellent Audio quality: Dreamboat or Reality?", International Broadcasting Convention Sep. 12–16, 1997, pp. 192–201, X002901563.*

* cited by examiner

Primary Examiner—Bunjob Jaroenchonwanit

(57) ABSTRACT

Apparatus and method for allowing a user to acquire and record information from the Internet may comprise a user interface that allows the user to identify at least one information service on the Internet that provides desired information and to select a desired completion time. A scheduler operatively associated with the user interface calculates a launch time to allow the desired information to be downloaded and recorded in its entirety before the desired completion time. A recording dispatcher operatively associated with the scheduler and the user interface begins downloading at the launch time the desired information from the information service. A recorder operatively associated with the recording dispatcher records the desired information to a recording medium.

20 Claims, 3 Drawing Sheets

AUDIO/VIDEO FROM INTERNET DIRECT TO COMPACT DISC THROUGH WEB BROWSER

CROSS-REFERENCE TO RELATED APPLICATION

This is a continuation of co-pending U.S. patent application Ser. No. 09/146,711, filed on Sep. 3, 1998, which is incorporated herein by reference for all that it discloses.

COMPUTER PROGRAM LISTING

This application contains computer program listings attached as Appendix A and Appendix B. These appendices have been submitted on a single compact disc (in duplicate) which contains Appendix A in a filed named "09955008.APPENDTXA.txt" of size 29 KB created on May 8, 2003, and Appendix B in a file named "09955008.APPENDIXB.txt" of size 6 KB created on May 8, 2003. The material contained in each of these files is hereby incorporated by reference.

FIELD OF INVENTION

The present invention pertains generally to Internet services, and more particularly, to a system and method for allowing a user to select and download audio/visual tracks from the Internet and to record them directly onto a CD via a web browser for later retrieval.

BACKGROUND

The proliferation of the World Wide Web through the Internet has made available a wealth of information with nearly instantaneous access time. Much of the information available is in multimedia (i.e., audio and/or video) format, including music tracks and news reports. The multimedia content may be completely dynamic, being updated daily, hourly, or even broadcast live.

It is often convenient to capture a selection of various tracks available over the Internet on a local portable media for later playback. With the availability now of writable compact discs (CDs) and the massive user base of CD players already in use, it would be desirable to provide a system and method for allowing a user to select and download various audio/visual tracks from the Internet and to record them directly onto a CD for later retrieval.

Depending on the size and format of the multimedia track, the bandwidth of the user's Internet connection, and the amount of traffic on the Internet at the time of download, the process required in visiting a service site, downloading a requested track, and listening to or watching the downloaded track may be time-consuming and/or inconvenient.

Accordingly, a need also exists for a system and method for selecting audio/video tracks from Internet multimedia service providers, automatically downloading the selected tracks, and writing the downloaded tracks to a CD for later retrieval by the user. It would also be convenient to provide a method for setting up a profile specifying the tracks and time desired, and having the CD created automatically without user intervention.

SUMMARY OF THE INVENTION

Apparatus for allowing a user to acquire and record information from the Internet may comprise a user interface that allows the user to identify at least one information service on the Internet that provides the desired information and to select a desired completion time. A scheduler operatively associated with the user interface calculates a launch time to allow the desired information from the information service to be downloaded and recorded in its entirety before the desired completion time. A recording dispatcher operatively associated with the scheduler and the user interface begins downloading at the launch time the desired information from the information service. A recorder operatively associated with the recording dispatcher records the desired information to a recording medium.

Also disclosed is a method for allowing a user to acquire and record information from the Internet that comprises the steps of: Retrieving a user profile that identifies at least one information service on the Internet the provides the desired information, the user profile also including a desired completion time; calculating a launch time to allow the desired information from the information service to be downloaded and recorded in its entirety before the desired completion time; initiating at the launch time the downloading of the desired information from the information service; and recording onto a storage medium the downloaded desired information from the information service.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION OF THE INVENTION

Figure 1:
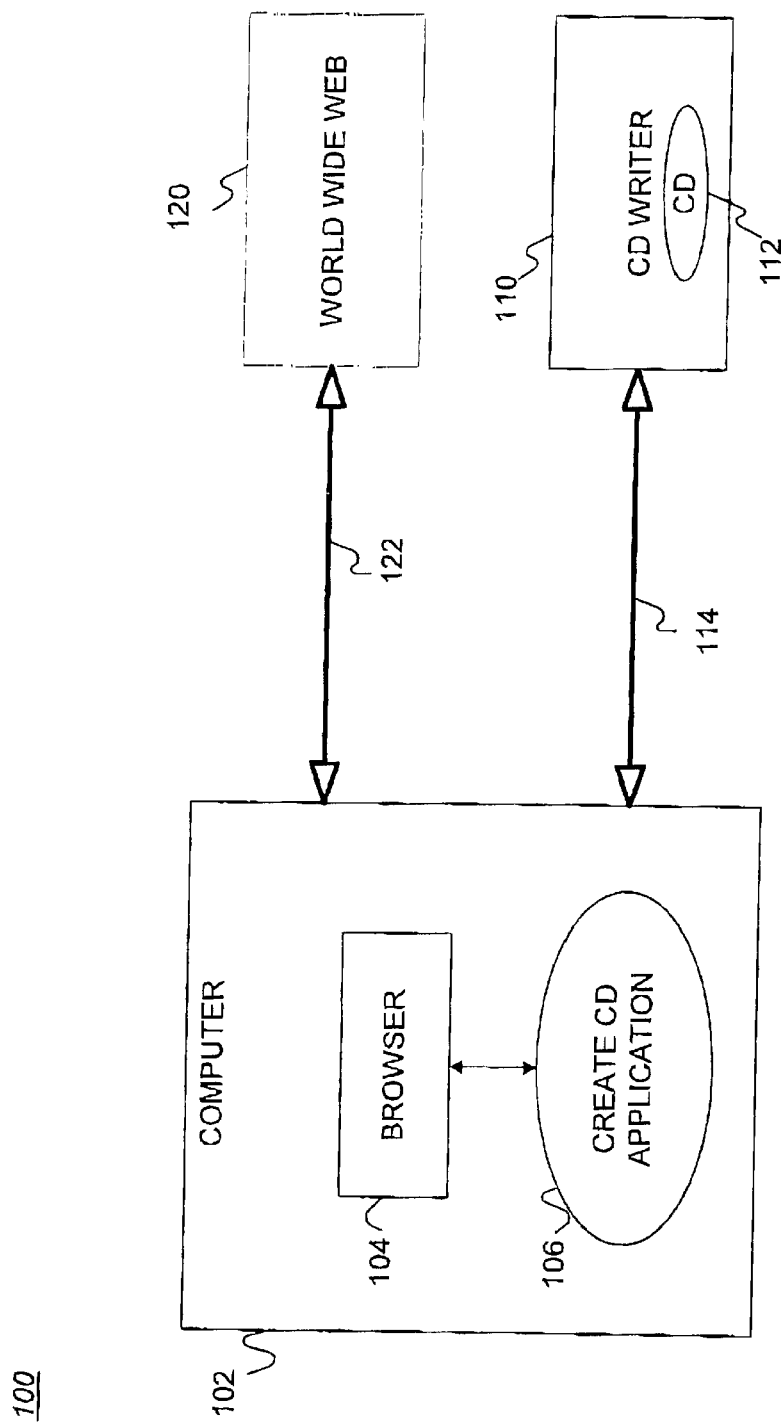
FIG. 1 is a block diagram of a system in accordance with the invention.

FIG. 1 is a block diagram of a system 100 in accordance with the invention. In system 100, a computer 102 running a create CD application 106 in accordance with the invention via an Internet browser 104 downloads user selected audio/video tracks from the World Wide Web 120 over an Internet connection 122. The user selects tracks from a list of available services, displayed by a user interface of application 106, in any desired combination and order. Application 106 schedules the selected downloaded tracks for recording to CD 112 in CD writer 110. At the scheduled time, the selected downloaded tracks are written to CD 112 via a communication interface 114. Once the CD 112 is recorded, the user may play back the contents of the CD on any CD drive compatible with the particular medium of CD 112. To initially obtain the create CD application 106, a user navigates, via the user's Internet browser 104, to a web site that allows the user to download the create CD application 106 and downloads the application. When the user launches a CD write operation from browser 104, a user interface is presented that allows the user to select audio/video tracks from multimedia service providers.

Figure 2:
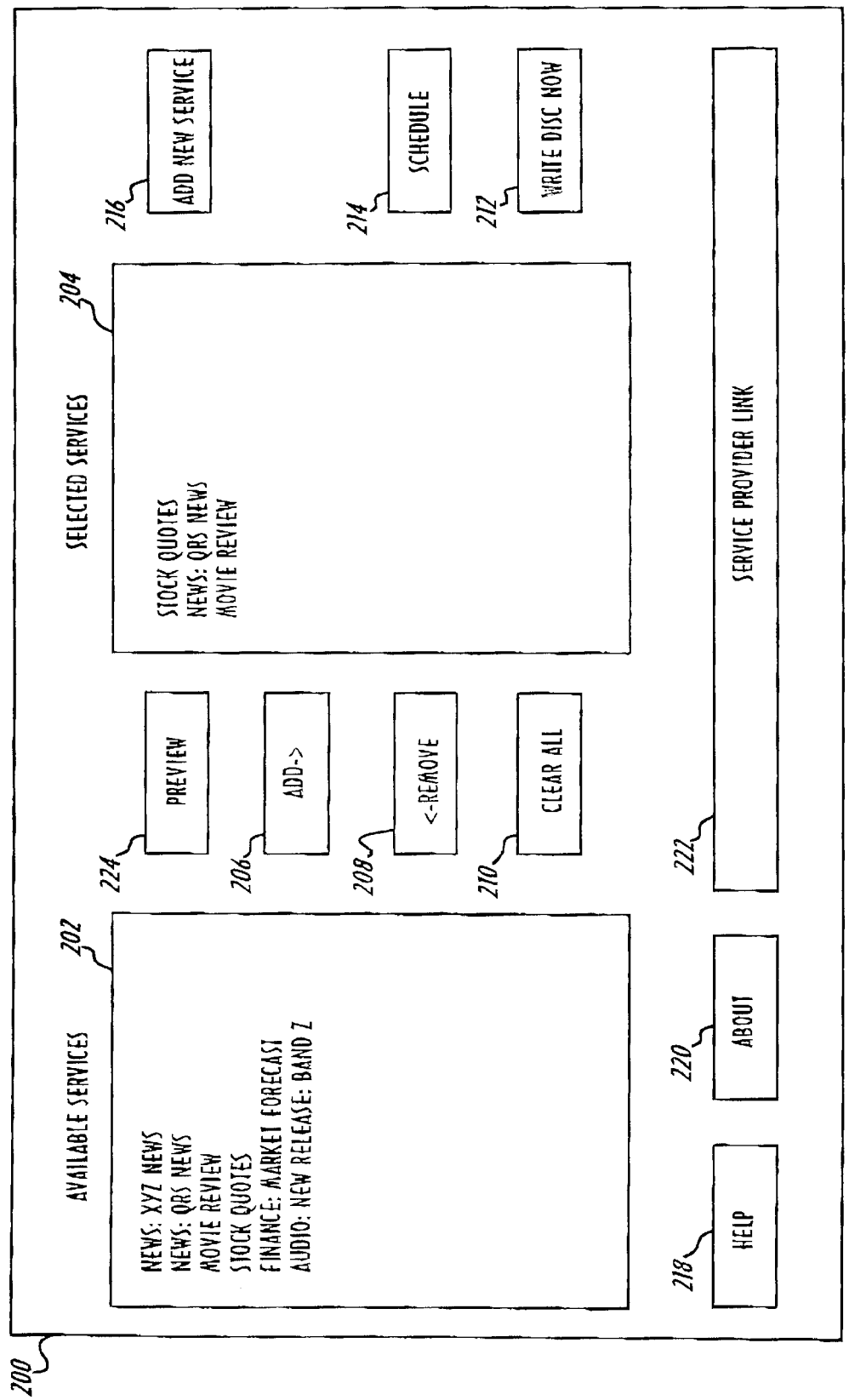
FIG. 2 is an illustrative embodiment of a user interface in accordance with the invention.

FIG. 2 is an illustrative embodiment of a user interface 200 displayed within the user's Internet browser 104 in accordance with the invention. As shown, user interface 200 includes a list of available services 202 and a list of selected services 204. The list of available services 202 includes a list of audio/video tracks made available by service providers. The list of available services 202 is typically configured by the provider of the user interface 200. Accordingly, the user interface 200 may vary from provider to provider, along with the services available through their user interface 200.

User interface 200 includes adding means 206 for allowing the user to select tracks from the list of available services 202 and the order in which to record them. In the illustrative embodiment, adding means 206 is implemented with an Active X Control button labeled "Add." The user moves the mouse or cursor over the desired service in the list of available services 202 so that the selected track is highlighted on the user display, and then clicks the "Add" button. The selected track then appears in the list of selected services 204.

In the illustrative embodiment, user interface 200 includes removal means 208, implemented with an Active X Control button labeled "Remove," that allows the user to remove a selection by moving the mouse or cursor over the desired track in the list of selected services 204 such that the desired track becomes highlighted, and then clicking on "Remove" button. The highlighted track then disappears from the list of selected services 204 and is not included to be recorded when the CD is created. All selected tracks may be removed from the list of selected services 204 via a "Clear All" button 210.

User interface 200 also includes writing means 212 that causes the tracks listed in the list of selected services 204 to be written to the CD media. In the illustrative embodiment, writing means 212 is implemented as an Active X Control button labeled "Write Disc Now" that launches a write CD write operation. The write CD operation (not shown) handles the communication interface between the user's computer and the CD writer drive.

Preferably, user interface 200 includes scheduling means 214 to allow the user to schedule the tracks in the list of selected services 204 to be written to CD. In the illustrative embodiment, scheduling means 214 is an Active X Control button labeled "Schedule," which when clicked on, launches a scheduling application. One application that the scheduling feature is particularly useful in is as a personal news recorder for making custom news and information discs. In this application, the user selects a number and order of available services desired such as the evening news, stock quotes, and entertainment news, then selects a desired ready time that the disc should be ready for pick-up, and activates the scheduling means 214 by clicking on the "Schedule" button. Scheduling means 214 launches a scheduling operation that schedules the download of the user-selected tracks and the time to launch the write operation for writing the tracks to the CD, such that the CD will be ready at the desired ready time. Thus, the CD is automatically created in the user-customized format without hands-on intervention and is ready for the user at his/her convenience. The user-customized profile (selected services, order, and desired ready time) may be scheduled to create a disc as often as the user desires.

User interface 200 may include additional features such as the ability to add or configure the list of available services. In the illustrative embodiment, this feature is provided by an Active X Control button 216 labeled "Add New Service," which launches a setup/configuration application when activated. Other features may include help facilities 218, information facilities 220 about the product or company, a link 222 to the provider's home web page, and more.

The illustrative embodiment of user interface 200 also provides previewing means 224, implemented as Active X Control button labeled "Preview." Previewing means 224 allows the user to highlight a track from the list of available services 202 and then activate the previewing means 224 to listen to or watch the highlighted audio/video track (or a portion of it) before deciding whether or not to add it to the list of selected services 204.

One application that this feature is particularly useful in is in a music retriever application. For example, a recording company may act as a service provider and supply a list of available audio tracks as the list of available services 202. Using the previewing means 224, the user may listen to a portion of a track in the list of available services 202 before adding it to the list of selected services which will be written to CD. Thus, the user can preview the track before writing it to CD in order to prevent unnecessary writing to the CD of those tracks ultimately not wanted.

Figure 3:
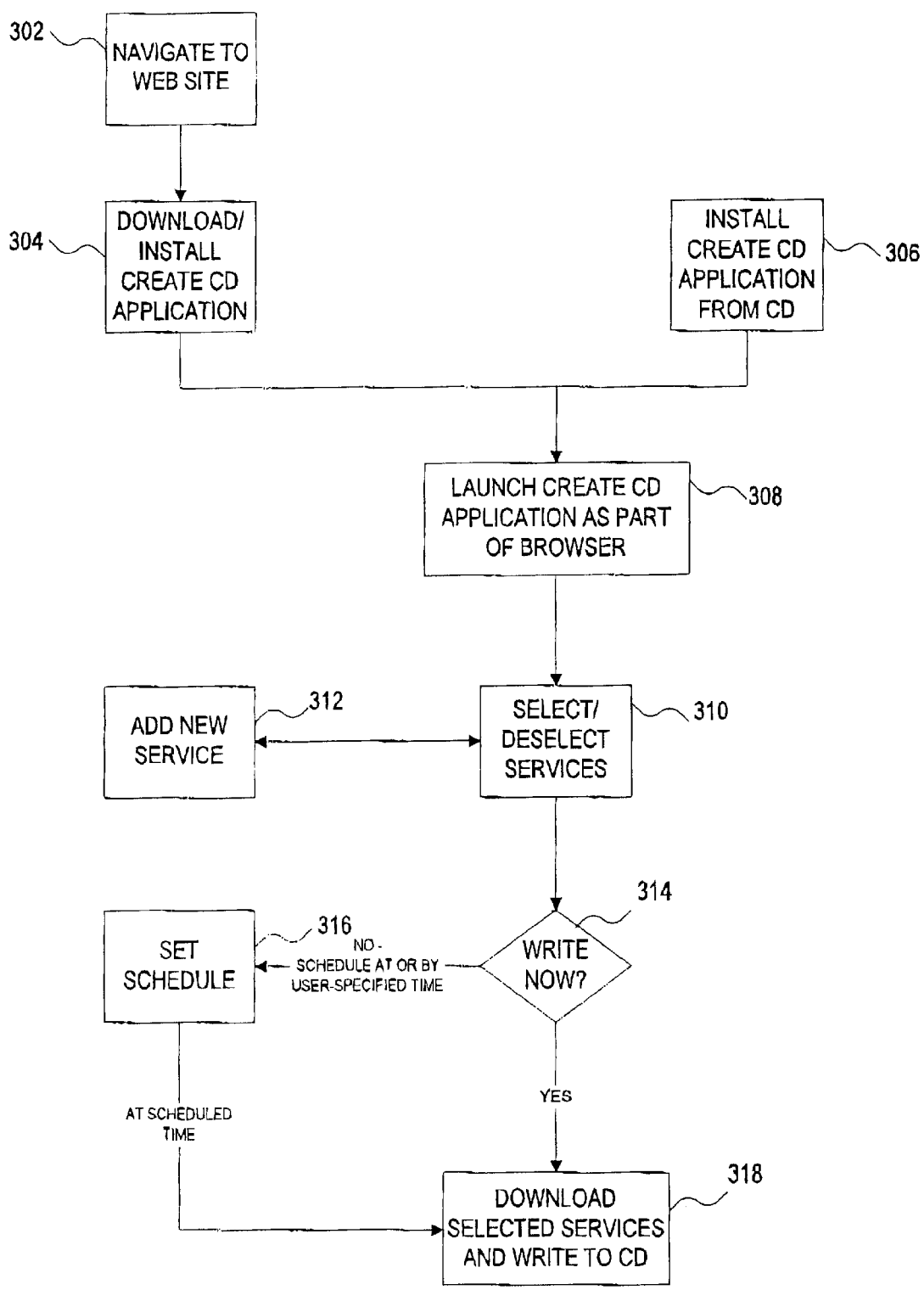
FIG. 3 is a flowchart of a method of the invention.

FIG. 3 is a flowchart of the steps taken by a user to perform the method of the invention. Initially, the create CD application must be installed on the user's system. This is performed either in a step 302 by navigating to a website that offers the create CD application for download and then downloading and installing the application on the user's system in step 304. Alternatively, the application may be provided on an install CD that is provided by the CD drive manufacturer/supplier. In the preferred embodiment, the application is provided in a Microsoft format ".cab" file, implemented as an ActiveX control that resides on an HTML web page of a web site. A cabinet is a single file created using Lempel-Ziv compression to hold a number of compressed files, and is used to save space and time during software distribution. During installation of a program, the compressed files in a cabinet are decompressed and copied to an appropriate directory for the user. In operation, the user navigates to the web site where the application is offered, and clicks on an HTML icon to download the create CD application. The cab file is then downloaded to the user's computer where it automatically unzips and decompresses itself and launches the user interface. As an alternative, in a Netscape Navigator environment, the application may be implemented as a plug-in.

Once the application is installed on the user's system, the user launches the application as part of the local Internet browser in a step 308. This step may be performed automatically when the create CD application is installed, or may be performed manually by the user by clicking on an icon associated with the application on the desktop or within a program. Launching the application brings up the user interface of the application on a page (e.g., user interface 200 of FIG. 2) within the user's browser. Once the user interface is displayed, the user may then add new services in step 312. Adding new services is performed by activating a configuration application which registers the URL of an authorized multimedia service provider with the application. The authorization of an multimedia service provider is typically obtained via an authorization code provided by prior agreement between the multimedia service provider and application vendor.

The user selects services from the list of available services (or deselects services from the list of selected services) in step 310. The content of the available services is provided by the server side of the multimedia track providers' web site. In the illustrative embodiment, the format of the multimedia services content is a RealAudio® ".ra" file captured to a ".wav" file. Service providers that wish to make their services available via the create CD application may be required to support a particular services content file format specified by the create CD application developer, or alternatively, the create CD application may include a file format converter that converts a number of file formats to the particular format that is written to the CD. Thus, for example, when a ".ra" audio/video track is downloaded from a service provider, the application may be implemented to convert the ".ra" track to a ".wav" file before writing the track to the CD. One embodiment may include a virtual sound card configured to convert audio/video tracks into a format that can be written to a CD. The user then directs the application to write the disk immediately in step 314, or sets up the scheduler to schedule the write to the disk in step 316. In one implementation, the source (URL), time and/or size, data type, and other conversion or calculation parameters associated with a selected service are registered in a registration file which the write application reads when it is launched. If the disk is to be written immediately via step 314, the registration file is passed as a parameter to the write application. The write application downloads each selected track designated in the registration file and then writes each downloaded track to the CD 112 in the CD writer 110 via the communication interface 114. In the preferred embodiment, communication interface 114 is a SCSI interface communicating via calls to Adaptec Easy-CD Toolkit (XCD) library, version 2.0, manufactured by Adaptec, Inc. The programmer's references are detailed in Adaptec Easy-CD Toolkit (XCD) 2.0, Part #: 100023—Manual revision: (G rev/Jan. 19, 1996), Jan. 20, 1997.

If the write to the CD is to be scheduled in step 316 for a later time, the user launches the scheduling application. Preferably, the scheduling application prompts the user for a desired completion time and is passed the registration file as a parameter. Then, scheduling application calculates how long the download and write to the CD will take based on the size, data type and sampling rates, modem speed, average network load for the requested time of day, and other system parameters or parameters contained the registration file to determine a time to launch the write application. Scheduling application then schedules the write application for that time. When the scheduled time arrives, the write application is launched, which downloads the selected tracks and writes them out to the CD writer drive in step 318.

Appendix A is an illustrative embodiment of an example user interface control file for a personal news recorder application of the create CD application of the invention. The user interface is implemented in Microsoft® Visual Basic. Section 1 of Appendix A defines each of the user interface boxes and command buttons, which include the main window of the personal news recorder, the operation status list, the preview timer, the preview command button, the help text box, the visit vendor picture box, the selected services list box, the available services list box, the write disc now command button, the schedule command button, the add new service command button, the clear all command button, the remove selected service command button, the add selected service command button, the help timer, the about this program command button, the help command button, the "available services" and "selected services" labels, and the borders and outlines. Section 2 of Appendix A contains the constant definitions and variable and external API declarations. For example, external API's for playing sound "WINMM.DLL" and for writing a wave file to CD "WRITEWAV.DLL" are declared in this section. Section 3 of Appendix A includes pseudocode for the subroutines associated with the user interface. These include routines for disabling all command buttons, enabling all command buttons, recording a track, responding to a click on the "About this Program" command button, adding a track to the selected services list in response to a click on the "Add" command button, responding to a click on the "Add New Service" command button, clearing the entire selected services list in response to a click on the "Clear" command button, responding to a click on the "Help" command button, responding to a click on the "Preview" command button, responding to a click on the "Remove" command button, responding to a click on the "Schedule" command button, and writing to the CD in response to a click on the "Write CD Now" command button. Each of the subroutines may call external routines to accomplish its action. For example, the routine WriteDiscNow_Click( ) calls external API writewav( ), a C implementation of the code used to write to the CD writer.

Appendix B is an illustrative embodiment of the C implementation for API writewav( ) which handles the writing out of tracks to the CD writer drive. Writewav( ) links in the Adaptec Easy-CD Toolkit (XCD) library, version 2.0, manufactured by Adaptec, Inc., that allows it to communicate with the CD writer via a SCSI interface.

The implementation is an instance of the user interface window defined in Appendix A. The instance is created via an ActiveX control and displayed within the Internet browser. The ActiveX control handles all of the processing of user input mouse clicks through the procedures defined in the Visual Basic code in Appendix A.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for allowing a user to acquire and record information from the Internet, comprising:

retrieving a user profile, said user profile comprising an identification of at least one information service on the Internet, the at least one information service on the Internet providing desired information, said user profile also comprising a desired completion time;

calculating a launch time to allow the desired information from the at least one information service on the Internet to be downloaded and recorded in its entirety before the desired completion time;

initiating at the launch time the downloading of the desired information from the at least one information service on the Internet; and recording onto a storage medium the downloaded desired information from the at least one information service on the Internet.

2. The method of claim 1, wherein said recording step comprises recording onto a portable medium the downloaded desired information from the at least one information service on the Internet.

3. The method of claim 2, wherein said recording onto a portable medium comprises the step of recording onto a CD the downloaded desired information from the at least one information service on the Internet.

4. The method of claim 1, further comprising providing a user interface, said user interface allowing the user to create said user profile.

5. The method of claim 1, wherein the desired information from the at least one information service on the Internet is periodically changed.

6. The method of claim 1, comprising periodically repeating said retrieving step through said recording step using said user profile.

7. The method of claim 1, wherein said desired completion time comprises a plurality of completion times defined by a schedule.

8. The method of claim 7, comprising repeating said calculating step through said recording step for each of said plurality of completion times defined by said schedule.

9. Apparatus for allowing a user to acquire and record information from the Internet, comprising:

a user interface responsive to user input, said user interface allowing the user to create a user profile, said user profile comprising an identification of at least one information service on the Internet, the at least one information service on the Internet providing desired information, said user profile also comprising a desired completion time;

a scheduler operatively associated with said user interface, said scheduler calculating a launch time to allow the desired information from the at least one information service on the Internet to be downloaded and recorded in its entirety before the desired completion time;

a recording dispatcher operatively associated with said scheduler and said user interface, said recording dispatcher causing the desired information from the at least one information service to be downloaded at said launch time; and a recorder operatively associated with said recording dispatcher, said recorder recording the downloaded desired information onto a recording medium.

10. The apparatus of claim 9, wherein said recording medium comprises a portable medium.

11. The apparatus of claim 10, wherein said portable medium comprises a CD.

12. Apparatus for allowing a user to acquire and record information from the Internet, comprising:

user interface means for allowing the user to identify at least one information service on the Internet, the at least one information service on the Internet providing desired information, and to select a desired completion time;

scheduling means operatively associated with said user interface means for calculating a launch time to allow the desired information from the at least one information service on the Internet to be downloaded and recorded in its entirety before the desired completion time;

recording dispatcher means operatively associated with said scheduling means and said user interface means for initiating at said launch time a download of the desired information from the at least one information service on the Internet; and recording means operatively associated with said recording dispatcher means for recording the downloaded desired information.

13. The apparatus of claim 12, wherein said recording means comprises a portable medium recorder for recording onto a portable medium the downloaded desired information.

14. The apparatus of claim 13, wherein said portable medium comprises a CD.

15. A method for allowing a user to acquire and record information from the Internet, comprising:

determining a user profile, said user profile comprising an identification of desired information available from the Internet, said user profile also comprising a desired completion time;

calculating a launch time to allow the desired information to be downloaded from the Internet and recorded in its entirety before the desired completion time;

initiating at the launch time the downloading of the desired information from the Internet; and recording onto a storage medium the downloaded desired information from the Internet.

16. The method of claim 15, wherein the user profile includes an identification of an information service on the Internet, the information service on the Internet providing the desired information.

17. The method of claim 16, wherein said recording step comprises recording on a portable medium the downloaded desired information from the Internet.

18. The method of claim 17, wherein said recording on a portable medium comprises the step of recording onto a CD the downloaded desired information from the Internet.

19. The method of claim 15, further comprising providing a user interface, said user interface allowing the user to create said user profile.

20. The method of claim 19, comprising periodically repeating said retrieving step through said recording step using said user profile.

* * * * *